Best Available Copy

United States Patent [19]

Suzuki et al.

[11] E Re. 28,513

[45] Reissued Aug. 12, 1975

[54] APPARATUS FOR AUTOMATICALLY TESTING PULMONARY FUNCTIONS

[75] Inventors: Takaji Suzuki, Kokubunji; Sunao Wada; Yukio Nishimoto, both of Hiroshima, all of Japan

[73] Assignee: Hitachi Limited, Tokyo, Japan

[22] Filed: Nov. 19, 1973

[21] Appl. No.: 416,833

Related U.S. Patent Documents

Reissue of:

[64] Patent No.: 3,621,835
Issued: Nov. 23, 1971
Appl. No.: 839,487
Filed: July 7, 1969

[30] Foreign Application Priority Data

July 8, 1968 Japan ..... 43-47107

[52] U.S. Cl. ..... 128/2.08; 128/DIG. 29
[51] Int. Cl. ..... A61b 5/08
[58] Field of Search ..... 128/2.08, 2.07, 2.1 R, 128/DIG. 29

[56] References Cited

UNITED STATES PATENTS

| | | | |
|---|---|---|---|
| 3,123,768 | 3/1964 | Burch et al. | 128/2.1 UX |
| 3,232,288 | 2/1966 | Krobath | 128/2.08 |
| 3,316,902 | 5/1967 | Winchel et al. | 128/145.5 |
| 3,319,624 | 5/1967 | Arp et al. | 128/2.08 |
| 3,433,217 | 3/1969 | Rieke | 128/2.08 |
| 3,480,006 | 11/1969 | Schomber | 128/2.08 |
| 3,511,237 | 5/1970 | Jaeger | 128/2.08 |
| 3,513,834 | 5/1970 | Suzuki et al. | 128/2.1 |

OTHER PUBLICATIONS

Hershberg, P. I. et al., Amer. Journ. of Med. Electronics, July–Sept. 1963, pp. 207–211.

*Primary Examiner*—Kyle L. Howell

[57] ABSTRACT

Apparatus for testing pulmonary functions which automatically measures vital capacity, measures volumes of air expired at predetermined intervals, compares vital capacity with a theoretical value, and compares vital capacity with expiratory volumes at different times, with electrical circuitry for providing start and end point detecting means, vital capacity detecting means, timed expiratory volume detecting means, time detecting means and ratio computing means.

27 Claims, 8 Drawing Figures

TAKAJI SUZUKI, SUNAO WADA, YUKIO NISHIMOTO INVENTORS
BY
John Lezdey
ATTORNEY

TAKAJI SUZUKI, SUNAO WADA
YUKIO NISHIMOTO
INVENTORS
BY
John Lezdey
ATTORNEY

TAKAJI SUZUKI
YUKIO NISHIMOTO
SUNAO WADA
INVENTORS
BY
John Lezdey
ATTORNEY

TAKAJI SUZUKI
YUKIO NISHIMOTO
INVENTORS
SUNAO WADA
BY
John Lezdey
ATTORNEY

TAKAJI SUZUKI, YUKIO NISHIMOTO, SUNAO WADA, INVENTORS
BY
John Lezdey
ATTORNEY

APPARATUS FOR AUTOMATICALLY TESTING PULMONARY FUNCTIONS

Matter enclosed in heavy brackets [ ] appears in the original patent but forms no part of this reissue specification; matter printed in italics indicates the additions made by reissue.

BACKGROUND OF THE INVENTION

Field of the Invention

This invention relates generally to apparatus for testing pulmonary functions and, more particularly, to an apparatus of the character which is adapted for the detection of a physiological disfunction in lung ventilation and for the determination of the extent and type of the disturbed function, if any, in the lung through quantitative assessment of the disfunction.

Description of Prior Art

For detecting and determining lung function failure such as for example bronchitis, silicosis and silico-anthracosis, it is presently an established practice to use a spirometric examination in which the vital capacity and forced expiratory volumes at predetermined intervals are measured for comparison with given values. To be more precise, the presence of a failure in the lung function is detected through comparison of the subject's vital capacity with a certain theoretical value which is dictated by the sex, age and height of the subject. The extent and type of the failure, on the other hand, is known if the correlation between the vital capacity and timed forced expiratory volumes is known.

A problem is, however, experienced in the testing of this type in that the measurement and quantitative treatment of the factors involved therein must be conducted entirely by human efforts. Such a problem becomes pronounced particularly where the examination of pulmonary functions is to be carried out on a public scale or repeatedly on a limited number of subjects. Thus, the spirometric examination of pulmonary functions in the known manner is considered obsolete in these days when early detection and diagnosis are required of respiratory diseases that are increasing in number and seriousness due to the atmospheric contamination in urban areas of late.

SUMMARY OF THE INVENTION

This invention therefore contemplates to eliminate this and other drawbacks thus far inherent in the conventional spirometric examination of pulmonary functions and it is a primary object of the invention to provide a new and improved apparatus for automatically detecting and diagnosing pulmonary functions with increased reliability and performance efficiency.

Another primary object of the invention is to provide an apparatus adapted for the examination of pulmonary functions on a public scale or repeatedly.

A further object of the invention is to provide an apparatus for automatically measuring the maximal expiratory volume of a subject, which volume is registered as his vital capacity.

A still further object of the invention is to provide an apparatus for automatically measuring the volumes of air expired by the subject at predetermined intervals.

A still further object of the invention is to provide an apparatus for comparing the subject's vital capacity with a given theoretical value for detection of a failure, if any, in the lung function.

A still further object of the invention is to provide an apparatus for automatically comparing the subject's vital capacity with his expiratory volumes at different times for determination of the extent and type of the failure involved in the lung.

A still further object of the invention is to provide an apparatus which will permit of testing the pulmonary functions with utmost accuracy and with no need of any professional skills.

BRIEF DESCRIPTION OF THE DRAWINGS

FIG. 1—B shows a curve differentiated of the curve of FIG. 1—A;

DESCRIPTION OF THE PREFERRED EMBODIMENT

For better understanding of the preferred embodiment of this invention, some theoretical backgrounds of the testing of the pulmonary function may be discussed with reference to FIGS. 1—A and B.

Figure 1A:
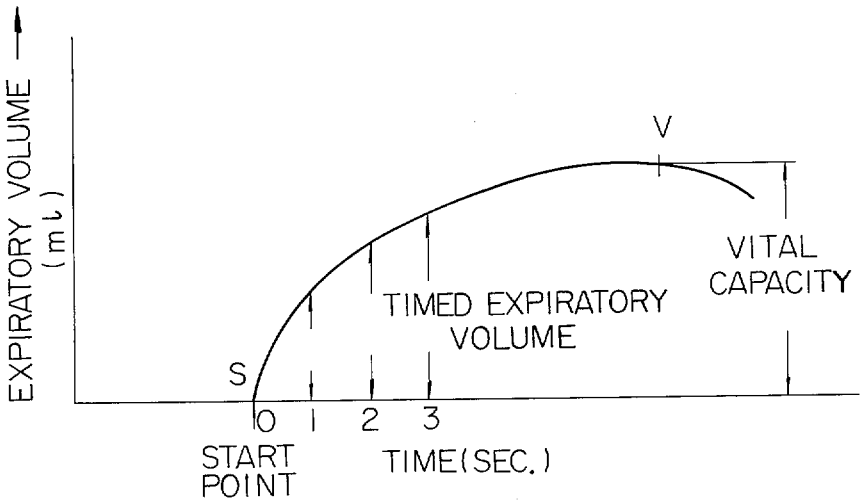
FIG. 1—A shows a typical example of the forced expiratory volume curve plotted against time in seconds.
Figure 1B:
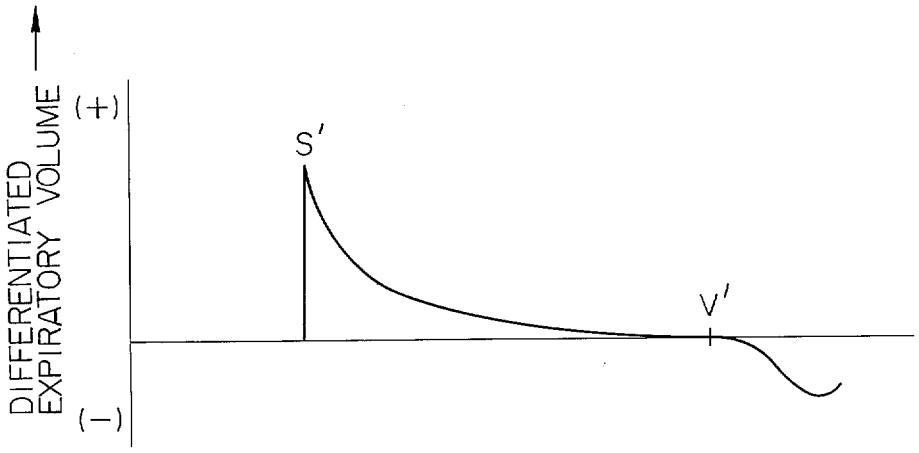

The expiratory volume of a normal subject, viz, the so-called forced expiratory volume, varies as illustrated in FIG. 1—A, against time in seconds starting from a full inspiration as measured by spirometer. The volume of air that can be expelled from the lung from a position of full inspiration is termed "vital capacity," which is equal to the maximal forced expiratory volume. As is apparent from the curve, the time element is a critical factor in the measurement of the expiratory volume, although it places no limitation on the vital capacity. Thus, it is presently a common practice in determining the extent and type of a disfunction in the lung to measure the amounts of forced expiratory volume at regular intervals of usually one, two and three seconds from the start of the expiration. These volumes taken at intervals are termed "timed expiratory volumes," which significantly lend themselves to the diagnosis of lung functions in general.

A failure in the lung is known from the ratio in percentage of the subject's vital capacity to a given theoretical value which is related to his sex, age and stature, the ratio being called a "percentage vital capacity." The extent and type of the failure, if it is found to exist in the lung, can be determined on the basis of the ratio of the vital capacity to timed expiratory volumes.

In order to accurately measure the subject's vital capacity and timed expiratory volumes, it is important to precisely determine the start point and peak value of the expiration and for this purpose it is convenient to have the expiratory volumes differentiated against time. One graphical representation of such a differentiated version of the expiratory volume is given in FIG. 1—B which shows a curve derived by differentiation of the curve of FIG. 1—A. As shown, the start point S of the expiration in FIG. 1—A is indicated at the maximum point S′ in FIG. 1—B, whilst the peak value V, which is the subject's vital capacity, corresponds in FIG. 1—B with the zero point V′. The expiratory volume thus differentiated against time is herein termed "differentiated expiratory volume," which is advantageously utilized to measure the vital capacity and timed expiratory volumes, as will be described later in more detail.

Figure 2:
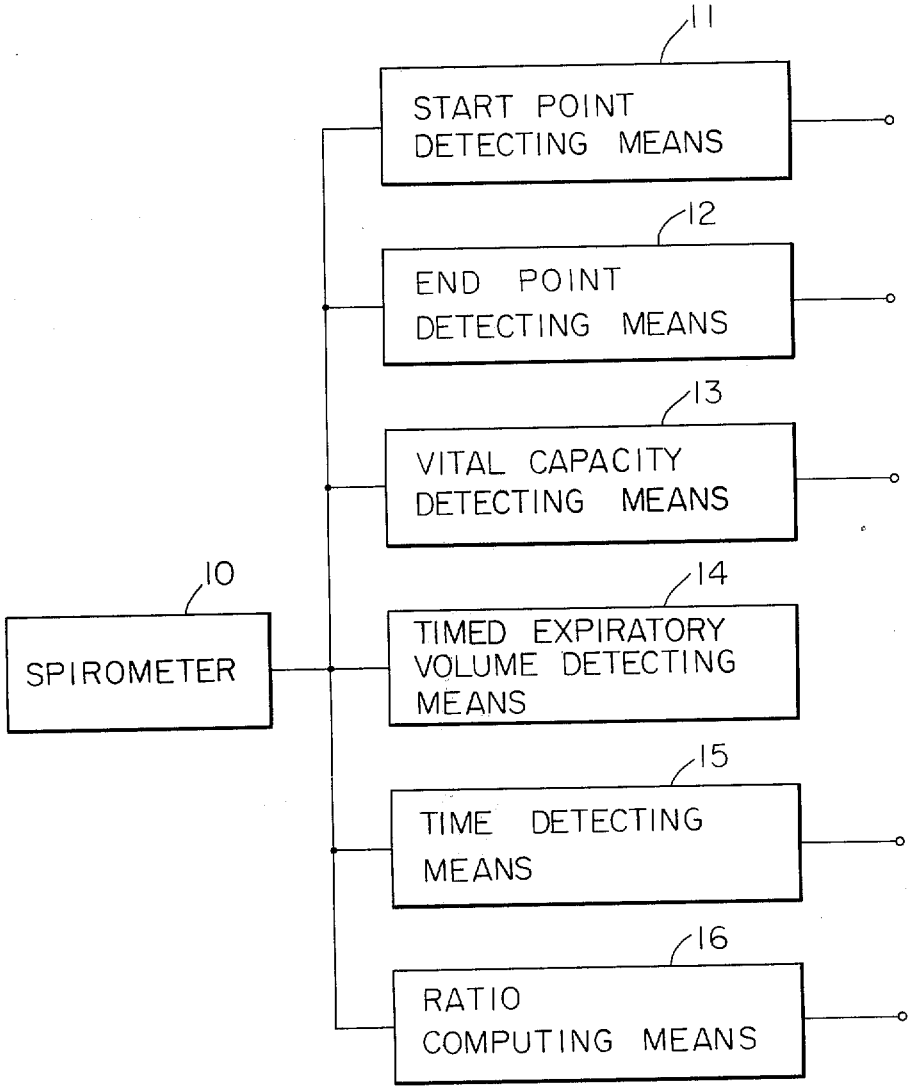
FIG. 2 is a schematic diagram showing the major functional blocks of the apparatus according to the invention.

Turning now to FIG. 2, the apparatus implementing the invention is intended for use in combination with a spirometer 10 of the conventional type into which is exhaled by the subject the air inspired to his capacity for registration of the ventilation out of his lungs during the expiration.

According to the invention, as is later to be described in more detail, the volume displacement as registered in the spirometer 10 is converted into electric signals, whereby the start and end points of the expiration and measurement of timed expiratory volumes and vital capacity of the subject are determined. Comparison is further made of the vital capacity with the timed expiratory volumes and with a certain theoretical value for quantitative assessment of the failure detected to exist in the lungs. All these procedures are effected in the apparatus of the present invention by means of an electronic circuit which is connected with the spirometer.

The electronic circuitry, to be connected with the spirometer 10 comprises, in terms of function, a start point detecting means 11, end point detecting means 12, vital capacity detecting means 13, timed expiratory volume detecting means 14, time detecting means 15, and ratio computing means 16, as diagrammatically shown in FIG. 2.

The start point detecting means 11 serves to detect the time point at which the subject has started to exhale into the spirometer, and the end point detecting means 12 to detect the time point at which the volume of air exhaled into the spirometer has ceased increasing. The vital capacity detecting means 13 functions to indicate the maximum value of the volume of air expired into the spirometer during the testing, while the expiratory volume detecting means 14 functions to indicate the amounts of expiratory volume at intervals instructed by the time detecting means 15 which measures the time elapsed since the start of the expiration. The vital capacity measured by the means 13 is then compared by means of the ratio computing means 16 with both the time expiratory volumes registered by the means 14 and a theoretical value which is supplied from an independent element of the construction described later, thereby providing the ratios of the vital capacity to the timed expiratory volumes and the theoretical value.

Figure 3:
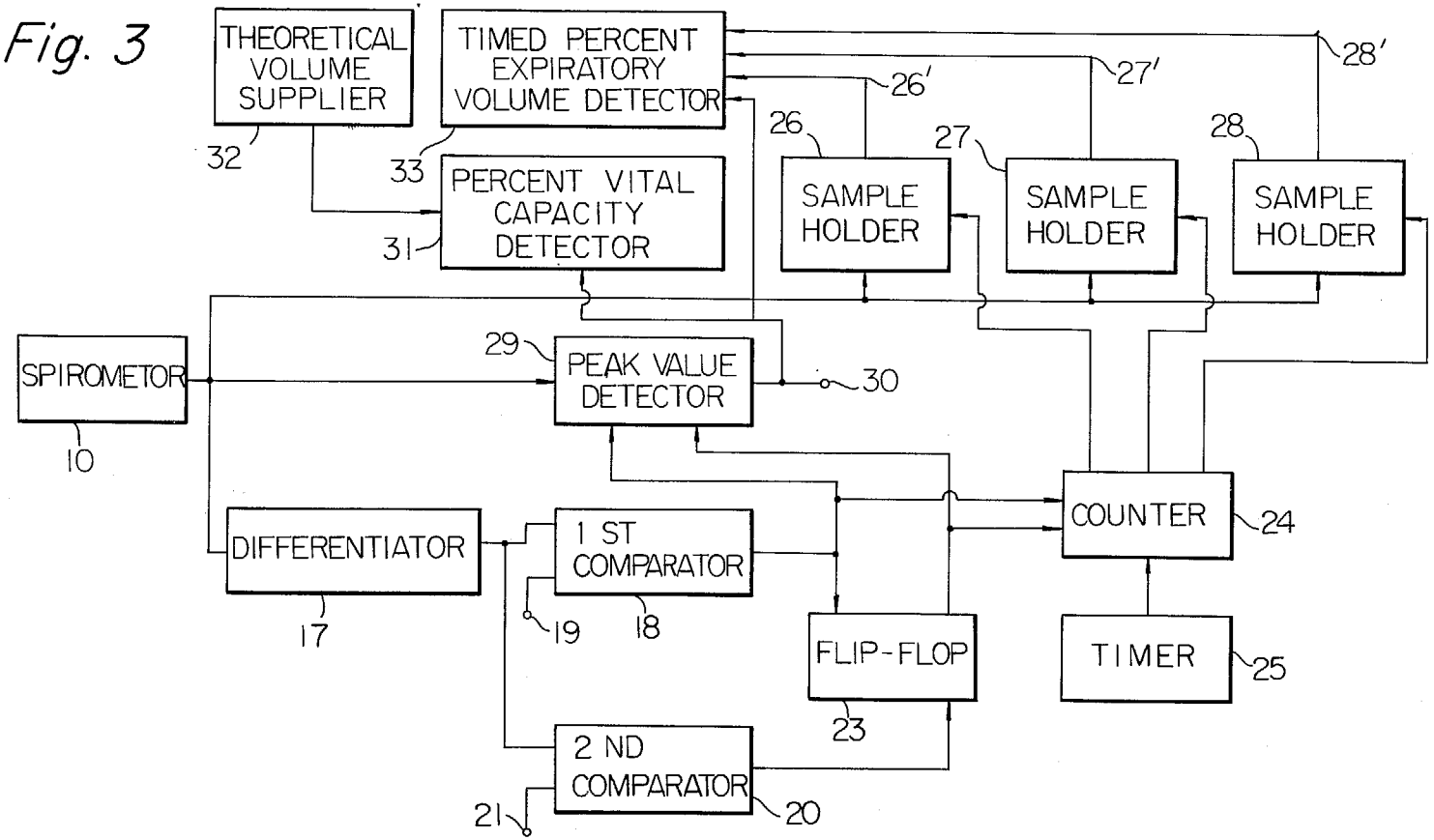
FIG. 3 is a schematic diagram showing an example of the general circuit arrangement of the apparatus shown in FIG. 2.

A practical example of the circuit arrangement of the apparatus comprising these functional means is illustrated in the block diagram of FIG. 3.

As shown, the start point detecting means 11 is herein constituted by a differentiator 17 connected with the spirometer 10 and a first comparator 18 connected with the differentiator. The differentiator 17 acts to differentiate the output signals of the spirometer 10 whereby the subject's differentiated expiratory volume is obtained. The comparator 18 receives the output of the differentiator 17 for comparison with the given voltage of a reference signal supplied through the terminal indicated at 19. The reference signal may be so determined as to correspond with 100 to 200 milliliter per second in expiratory volume by way of example. Once the input of the comparator exceeds the voltage of the signal thus determined, an output is obtained from the comparator 18 to indicate that the expiration has started.

The end point detecting means 12, on the other hand, is constituted by the differentiator 17 and a second comparator 20 connected with the differentiator. The comparator 20 receives the output of the differentiator 17 for comparison with a negative reference voltage supplied through the terminal indicated at 21. Once the output of the differentiator 17 becomes lower than the reference voltage, an output is obtained from the comparator 20 to indicate that the expiratory volume has ceased increasing.

To the two comparators 18 and 20 is connected a flip-flop 23 which receives the outputs of the comparators whereby a rectangular pulse is formed on an output terminal to the flip-flop 23, the leading edge of the rectangular pulse corresponding to the start point detected by the comparator 18 and the trailing edge corresponding to the end point detected by the comparator 20. Therefore, this pulse is called in this specification "start-to-end" signal. The flip-flop 23 is further connected with a counter 24 which, in turn, is connected with a timer 25. The counter 24 serves to count the output pulse signals supplied at regular intervals (of 5 milliseconds, for example) from the timer 25 throughout the duration of the start-to-end signal, thereby generating sampling pulses.

Thus, the counter 24 and timer 25 constitute the aforesaid time detecting means 15.

The sampling pulses generated at the counter 24 are introduced into sample holders 26, 27 and 28 which are connected with the spirometer 10, and supplied therefrom signals representing the momentary expiratory volumes, whereby signals indicating the timed expiratory volumes at predetermined intervals, say, one, two and three seconds from the start point, appear at the output terminals 26′, 27′ and 28′.

The sample holders 26, 27 and 28 with their respective output terminals 26′, 27′ and 28′ thus serve as the timed expiratory volume detecting means 14.

It is to be noted that although the sample holders are shown to be three in number, a larger or smaller number of them may be used, if desired.

Connected further with the spirometer 10 is a peak value detector 29 which serves as the vital capacity detecting means 13 shown in FIG. 1. The peak value detector, the detailed circuit arrangement of which is to be discussed later, is used to obtain the maximum value of the expiratory volumes that are momentarily registered in the spirometer 10 under the control of the first comparator 18 and flip-flop 23. The output signal of the peak value detector 28 appears at the terminal 30 thereof.

Designated respectively at 31, 32 and 33 are a percent vital capacity detector, theoretical value supplier and timed percent expiratory volume detector, all of which comprise the ratio computing means 16.

The percent vital capacity detector 31 receives the outputs of the peak value detector 29 and theoretical value supplier 32 for indication of the ratio, in a digital form, of the subject's vital capacity to a given theoretical value, whilst the timed percent expiratory volume detector 33 receives the outputs of the peak value detector 29 and the sample holders 26, 27 and 28 through the respective terminals 26', 27' and 28' for indication of the ratios of the subject's timed expiratory volumes to his vital capacity at predetermined intervals.

Figure 4:
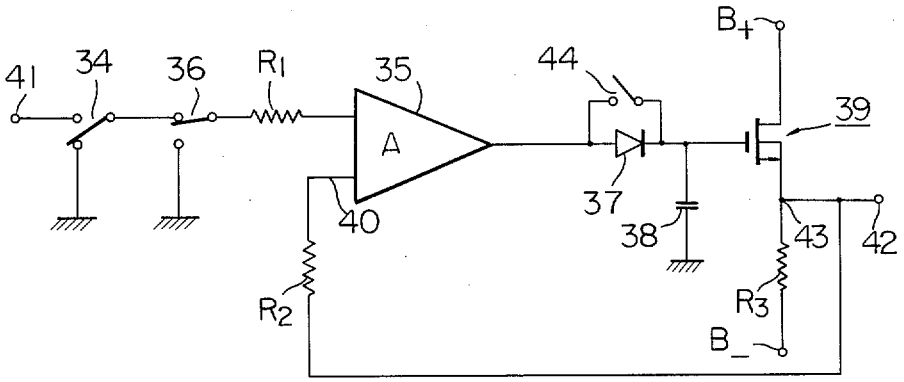
FIGS. 4 to 6 show the detailed circuit arrangements of the peak value detector, means for providing the theoretical reference value of expiratory volume and means for providing the ratio of the subject's vital capacity to the theoretical reference value, respectively, used in the apparatus shown in FIG. 3.

A preferred example of the circuit arrangement of the peak value detector 29 is shown in FIG. 4. As shown, the peak value detector comprises an electronic switch 34 which is controlled by the aforementioned flip-flop 23, an operational amplifier 35 to which is connected the electronic switch 34 through a reset relay 36 and an input resistor element R1, a diode 37 connected with the output terminal of the operational amplifier 35, a capacitor 38 connected with the diode 37 for holding or charging the peak value of the expiration, and a source follower 39 comprising an insulated gate field effect transistor for obtaining the output from the capacitor 38. The output of the field-effect transistor or source follower 39 is fed back to the feedback input terminal 40 of the amplifier 35 through a feedback resistor element R2 so as to negatively feed back its output thereto. The output of the spirometer 10 is applied to the input terminal 41 of the detector 29 thus constructed. Designated at 42 is the output terminal of the detector 29, to which is connected the source electrode 43 of the field-effect transistor. The terminals B+ and B− of the source follower are positive and negative, respectively, the latter being applied through a source resistor element R3. The aforesaid diode 37 is connected at both ends with a reset relay 44.

Figure 5:
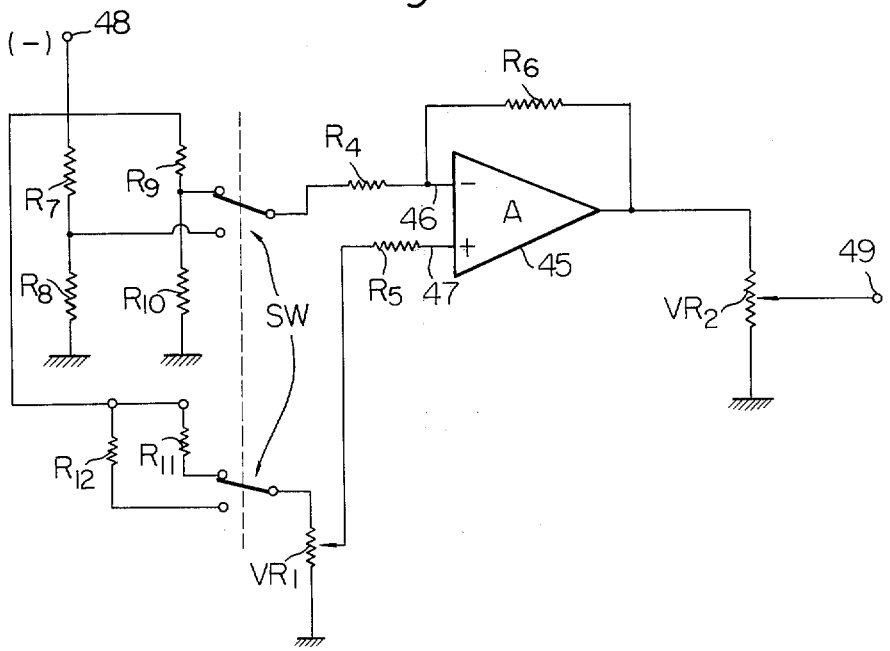

The theoretical value supplier 32 as abovementioned may be constructed as illustrated in FIG. 5. As shown, the theoretical value supplier 32 comprises an operational amplifier 45 serving as a subtractor, resistor elements R4 and R5 connected to the negative and positive terminals 46 and 47, respectively, of the amplifier 45, resistor element R6 serving as a feedback resistor for the amplifier 45, resistor element R7 to R12 intended for setting a predetermined constant related to the subject's age and height, potentiometers VR1 and VR2 using variable resistor elements, change-over switch SW for setting a constant related to the subject's sex, a negative terminal 48 for power supply and an output terminal 49.

Figure 6:
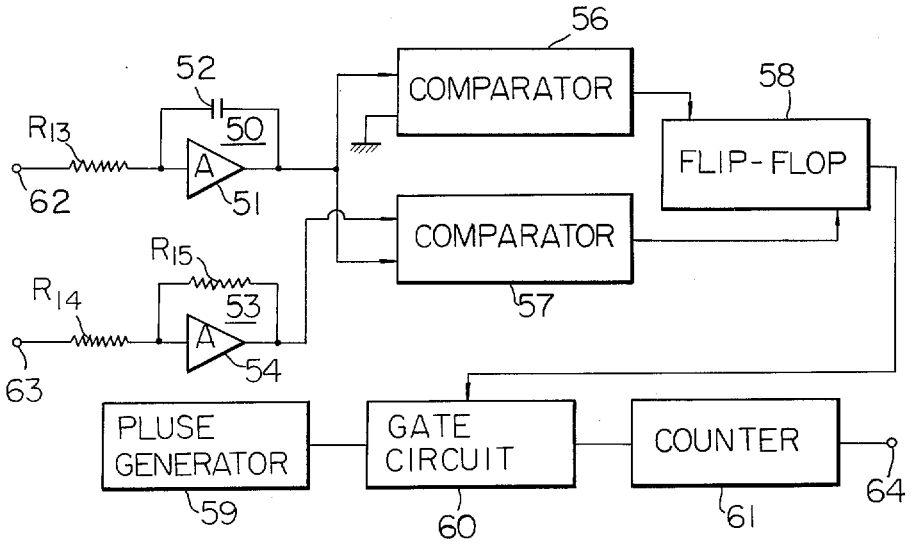

FIG. 6 illustrates a block diagram of the percent vital capacity detector 31 which is adapted to obtain a digitalized ratio of the subject's actual vital capacity to a given theoretical value. As shown, the detector 31 comprises an integrator 50 consisting of an operational amplifier 51, input resistor R13 and capacitor 52, a signal converter 53 comprising an operational amplifier 54, input resistor R14 and additional resistor R15, a first comparator 56 which is at one terminal connected with the integrator 50 and at the other grounded, a second comparator 57 which is at one terminal connected with the integrator 50 and at the other with the inverter 53, a flip-flop 58 which receives the outputs of the comparators 56 and 57, a pulse signal generator 59, a gate circuit 60 which is connected with the generator 59 and which is so controlled as to open or close by the output of the flip-flop 58, and a counter 61 for counting the outputs of the pulse signal generator 59 through the gate circuit 60. Designated at 62 and 63 are the input terminals of the integrator 50 and sign inverter 53, respectively, and at 64 the output terminal of the counter 61. The integrator 50 is initially set at a positive value.

OPERATION

As soon as the subject starts to exhale air into the spirometer 10, the volume displacement as registered therein in correspondence with the increase of the subject's expiratory volume is converted continuously into electric signals, which are then supplied to the differentiator 17, peak value detector 29 and sample holders 26, 27 and 28.

The signals introduced into the differentiator 17 are differentiated therein and supplied to the comparators 18 and 20. As is apparent from FIG. 1—B, the curve of the expiratory volume thus differentiated peaks out approximately at the start point S'. This is because a normal subject inhales air immediately after he has exhaled to his capacity. The differentiated curve falls gradually past the start point S until it becomes negative immediately past the end point V'. Immediately when the voltage applied to the comparator 18 exceeds the positive reference voltage supplied thereto from the terminal 19, an output signal is obtained from the comparator 18 to cause the flip-flop 23 to be reset, indicating the start point of the expiration as represented by the point S in FIG. 1—A, and point S' in FIG. 1—B. Once, on the other hand, the voltage applied to the comparator 20 becomes lower than the negative reference voltage supplied thereto from the terminal 21, an output signal is obtained from the comparator 20, indicating that the output of the differentiator 17 has become negative at that moment as indicated at the point V' in FIG. 1—B, i.e. that the subject's expiratory volume has stopped increasing as indicated at point V in FIG. 1—A.

The output of the comparator 18 is applied to the flip-flop 23, counter 24 and peak value detector 29, causing on the one hand the counter and peak value detector to be reset and on the other the flip-flop to be set. The outputs of the counter 24 and peak value detector 29 are eliminated at one time with an output signal obtained from the comparator 18.

The peak value detector 29 is set with the rise of the output signal from the flip-flop 23 and detects the maximum value of the output of the spirometer 10. The counter 24 simultaneously counts the pulse signals generated at the timer 25 at, for example, 5 milli-second intervals thereby to produce pulse signals at one, two and three seconds after the counter and peak value detector in reset. These pulse signals are applied to the respective sample holders 26, 27 and 28 as sampling instruction signals therefor. The sample holders 26, 27 and 28 sample and hold the output signals obtained from the spirometer 10 at one, two and three seconds from the start of expiration.

As soon as the signals representing the differentiated expiratory volumes as supplied from the differentiator 17 becomes negative as previously described, the comparator 20 is permitted to produce its output to reset the flip-flop 23, with the result that the peak value detector 29 and counter 24 are reset accordingly. The detector 29 thus registers the maximum value of the expiratory volumes as the subject's vital capacity.

Here, it will be understood that the vital capacity appears at the output terminal 30 of the peak value detector 29 as the maximum value of the subject's expiratory volume and that the expiratory volumes as timed at one, two and three seconds from the start point of the expiration appear at the output terminals 26', 27' and 28', respectively.

It will also be understood that expiratory volumes times otherwise may, of course, be selectively obtained, if desired.

Although the end point of the expiration has been described to correspond to the appearance of a negative output from the differentiator 17, it may be determined to be any desired time point after the start of the expiration, by preference. In this instance, the flip-flop 23 may be reset with the output of the counter 24 after a predetermined time duration which is detected at the counter 24.

Referring to FIG. 4, when the flip-flop 23 is set with the output of the comparator 18 at the start point of the expiration, then the electronic switch 34 of the peak value detector is caused to close with the rise of output signal of the flip-flop 23. The output of the spirometer 10 is consequently applied to the input terminal of the operational amplifier 35 so that the maximum voltage of the signal is held in the capacitor 38 through the diode 37. The maximum voltage is negatively fed back through the source follower 39 and resistor element R2 to the operational amplifier 35 whereby the diode 37 is inversely biased and, as the consequence, the maximum voltage of the signal from the spirometer 10 is obtained from the output terminal 42 through the source follower 39. Then, as the flip-flop 23 is reset by the output of the comparator 20 at the end point of the expiration, the electronic switch 34 is actuated to open with the fall of the output signal of the flip-flop 23 so as to cut off the output of the spirometer 10. The input of the amplifier 35 being grounded through the reset relay 36, only the maximum value in voltage of the expiratory volume from the spirometer 10 appears at the output terminal 42. Thus, the maximum value of the expiratory volume as obtained from the spirometer 10 from the time point at which the flip-flop 25 is set to the time point at which it is reset is detected. It may be mentioned that the reset relays 36 and 44 are actuated with the reset signal from the comparator 18 immediately before the start of the measurement so that they work to simultaneously reset the operational amplifier 35 and the diode 37 by making a short-circuit.

The subject's vital capacity and timed amounts of the expiratory volume lend significantly not to only accurately detecting the presence of a failure, if any, in his lungs but also to determining the type and extent of the such failure if they are assessed in conjunction with a certain reference value which is determined theoretically in dependence upon his conspicuous physical status such as sex, age and height.

Now, as is well know, the theoretical vital capacity VC or VC' of a given male or female subject, respectively is determined from the following formula:

$$VC = (27.63 - 0.112 \times \text{age}) \times \text{height} \quad (1)$$

$$VC' = (21.78 - 0.101 \times \text{age}) \times \text{height} \quad (2)$$

In the aforesaid circuit connections of the theoretical value supplier which is shown in FIG. 5, the voltage corresponding to the constant 27.63 as appearing in the above Formula 1 is determined by the resistor elements R7 and R8 and the voltage corresponding to the constant 21.78 in the Formula 2 is determined by the resistor elements R9 and R10. Whereas, the voltage corresponding to the value "0.112×age" in the Formula 1 is determined by the resistor element R11 and potentiometer VR1 and the voltage corresponding to the value "0.101×age" in the Formula 2 is determined by the resistor element R12 and potentiometer VR1. The difference of sex is dictated by the position of the change-over switch SW. In the case of a male subject, as an example, the switch is shifted to the position as illustrated in FIG. 5, in which instance the voltage corresponding to the constant 27.63 and the voltage corresponding to the value "0.112×age" are applied to the negative and positive input terminals 46 and 47, respectively, of the operational amplifier 45 through the resistor elements R4 and R5. If the switch SW is shifted to the opposite position for examination of a female subject, then the voltage corresponding to the constant 21.78 and the voltage corresponding to the value "0.101 times age" are applied through the input resistor elements R4 and R5 to the negative and positve input terminals 46 and 47, respectively, of the amplifier 45. The output of the operational amplifier 45 serving as a subtractor is multiplied by the voltage corresponding to the subject's height by means of the potentiometer VR2 and appears at the output terminal 49, thus providing the theoretical value of the subject's vital capacity in terms of voltage in accordance with the value dictated by the above formula.

The theoretical value of the subject's vital capacity is then compared with his actual vital capacity and with the timed amounts of his forced expiratory volumes detected after one, two and three second durations from the start of the expiration by means of the percentage vital capacity detector shown in FIG. 6. The principle of operation of the percentage vital capacity detector 31 is such that the output of the integrator 50 to which the theoretical value A of the vital capacity is applied as its input is compared by the comparator with the subject's own vital capacity B and then the duration t from the start point of the expiration to the point at which the value A exceeds the value B is measured.

The relationship between the duration t, theoretical value A and actual value B is expressed as:

$$A \cdot t = B \quad (3)$$

and hence, $$t = B/A \quad (4)$$

Referring to FIG. 6, the voltage corresponding to the theoretical value of the vital capacity is applied to the integrator 50 through the input terminal 62 and the voltage corresponding to the subject's vital capacity B as measured is applied to the signal coverter 53 through the input terminal 63. The output voltage of the signal coverter 53 is then applied to the comparator 57 with its polarity inverted as one input thereof. The output voltage of the integrator 50, which linearly changes in the negatives direction in proportion to the input voltage, is applied to the comparator 56 as one input thereof and to the comparator 57 as another input thereof. As a result, when the output voltage of the integrator 50 traverses the zero level, the comparator 56 produces an output. The input is applied to the flip-flop 58 which consequently is brought into a set position. The gate circuit 60 is opened with the rise of the output voltage of the flip-flop 58, whereupon the pulse signals from the pulse signal generator 59 are applied through the gate circuit 60 to the counter 61, by which the pulses thus supplied thereto are counted. When the output voltage of the integrator 50 becomes equal to that of the signal converter 53, the comparator 57 is permitted to produce its output. The output is applied to the flip-flop 58, which consequently is shifted to reset a position. The gate circuit 60 is closed with the fall of the output voltage of the flip-flop 58, whereupon the pulse signal from the pulse signal generator 59 is inhibited by the gate circuit 60.

Thus, the counter 61 counts the number of pulses, which is proportioned to the ratio of the subject's actual vital capacity B to the theoretical value A. If this number of pulses is applied through the output terminal 64 of the counter 61 to a recorder (not shown) such as, for example, a digital printer, the subject's percent vital capacity will be obtained on the basis of the number of pulses thus recorded.

Furthermore, the ratio of the subject's vital capacity to the timed expiratory expired volume at, for example, one, two and three second intervals will be obtained from the number of the pulses, if both the voltage corresponding to the subject's vital capacity is applied through the input terminal 62 to the integrator 50 and the voltages corresponding to his expiratory volume which are timed at one, two and three second durations from the start of the expiration are applied through the input terminal 63 to the signal converter 53.

Figure 7:
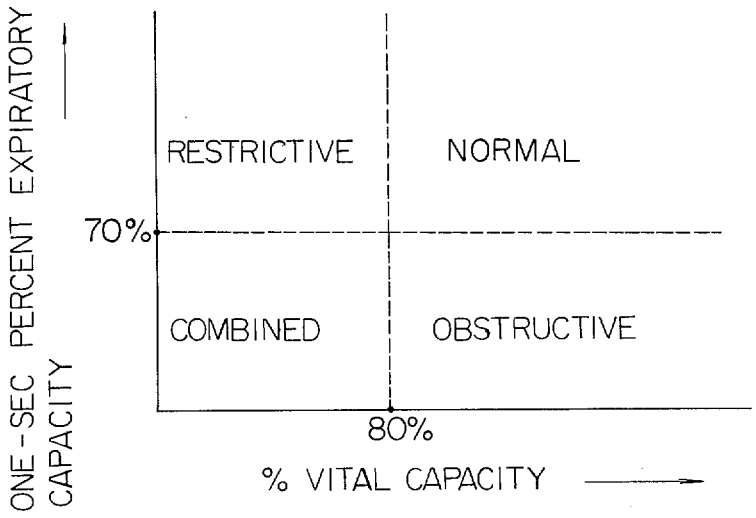
FIG. 7 is an example of the chart which is presently proposed for quantitative assessment of the pulmonary functions.

It is now apparent from the foregoing description that the precent vital capacity and timed percent expiratory volumes of a given subject are obtained as an analog-to-digital converted values by simply changing the inputs of the integrator 50 and signal converter 53. More practically, the existence and extent of a pulmonary function failure may be clinically diagnosed on the bases of the chart of FIG. 7, which is usually used for the purpose of quantitatively diagnosing the pulmonary function by the percent vital capacity and one-second percent expiratory volume of the subject, wherein the one-second percent expiratory volume is taken on the ordinate and the percent vital capacity on the abscissa. When the value corresponding to the two numbers of pulses representing, respectively, the percent vital capacity and the one-second percent expiratory volume are over 80 percent and over 70 percent, respectively, it is recognized that the subject's pulmonary function is in a normal state. Various impairments, such as restrictive impairment, combined impairment and obstructive impairment, can also be similarly recognized in accordance with the recognizable chart of FIG. 7.

It will be understood from the foregoing description of the present invention that the pulmonary function is automatically diagnosed within and as short as ten and several second period of time so as to permit of the quick and accurate diagnosing of lungs with no professional skills required. The apparatus according to the invention thus lends significantly to a group examination and early detection of pulmonary function failures.

We claim:

1. An apparatus for automatically testing the pulmonary function of a subject in combination with a spirometer which is adapted to produce an electric signal having an amplitude corresponding to the subject's expiratory volume of air exhaled thereinto by the subject, which apparatus comprises:

first means adapted to receive the electric signal by the spirometer and to produce start and start-to-end signals when the amplitude of the electric signal exceeds a first predetermined level and falls below a second predetermined level;

second means adapted to receive the electric signal and to produce a peak value signal representative of the maximum value of the amplitude of the electric signal which being reset and set by said start and start-to-end signals from said first means;

third means adapted to receive said start and start-to-end signals from said first means and to produce at least one sampling signal at a time when preselected period has elapsed from the time when it receives said start signal;

fourth means adapted to receive the electric signal and said sampling signals to sample the electric signal so as to produce a timed expiratory signal when it receives said sampling signal from third means;

fifth means adapted to receive said peak value signal from said second means and timed expiratory signal from said fourth means for providing the ratios of said peak value signal to said timed expiratory signal and to a predetermined theoretical value and adapted to be connected to a recorder or indicator so as to record or indicate said ratios for quantitative assessment of the subject's pulmonary function.

2. An apparatus according to claim 1, wherein said first means comprises:

a differentiator adapted to receive the electric signal from said spirometer and to produce on its output terminal an output signal of a differentiated version of the electric signal;

a first comparator one input terminal of which is connected to the output terminal of said differentiator to receive said output signal from said differentiator and through the other input terminal of which a first reference signal is supplied thereto for comparing said output signal and said first reference signal so as to produce said start signal when the amplitude of said output signal exceeds said first reference signal;

a second comparator one input terminal of which is connected of said output terminal to said differentiator in parallel with said first comparator so as to receive said output signal from said differentiator and through the other terminal of which a second reference signal is adapted to be supplied thereto for comparing said output signal and said second reference signal so as to produce an end signal on its output terminal when said output signal falls below said second reference signal; and flip-flop circuit one input terminal of which is connected to said output terminal of said first comparator through which said start signal is applied setting the flip-flop circuit and the other of which is connected to said output terminal of second comparator through which said end signal is applied resetting said flip-flop circuit whereby on the output terminal of said flip-flop circuit said start-to-end signal is produced.

3. An apparatus according to claim 1, wherein said third means comprises:

a timer which produces on its output terminal an output pulse train with regular intervals; and a counter connected to the output terminal of said timer and said first means so as to receive said output pulse train from said timer and said start-to-end signal from said third means for producing at least one sampling signal by counting the number of pulse train while being controlled by said first means.

4. An apparatus according to claim 1, in which said fourth means comprises at least one sample holder adapted to receive the electric signal through one of its input terminals, the other of its input terminals being connected to the output terminal of said counter of said third means, which sample holder is adapted to produce said timed expiratory signal when it receives said sampling signal through the other input terminal.

5. An apparatus according to claim 1, in which said fifth means includes a percent vital capacity detector connected with said second means and theoretical reference value supplier connected with said percent vital capacity detector for supplying thereto a signal of a predetermined theoretical reference value with which is compared the output signal of said second means for computing the ratio of the value of said output signal to said theoretical reference value.

6. An apparatus according to claim 5, wherein said theoretical value supplier comprises:

an operational amplifier serving as a subtractor having negative and positive input terminals and an output terminal;

a first set of resistor elements for determining the coefficient factor appearing in the theoretical vital capacity of male and female subjects;

a second set of resistor elements for determining the age factor appearing in the theoretical vital capacity of male and female subjects;

a set of change-over switches connected to said negative and positive input terminals for switching said coefficient and age factor; and a potentiometer connected to said output terminal for multiplying the output signal of said amplifier by a factor representing the height of said subject appearing in the theoretical vital capacity, so that the theoretical vital capacity of male and female are respectively obtained from said potentiometer.

7. An apparatus according to claim 5, wherein said percent vital capacity detector comprises an integrator connected with the output terminal of said theoretical value supplier for integrating the output thereof, signal converter connected with said peak value detector for inverting the polarity of the output thereof, a first comparator which is connected at one input terminal thereof with the output of said integrator and which is grounded at the other input thereof for comparing the output of said peak value detector with the output of said theoretical value supplier to generate an output once the latter output exceeds the ground level, a second comparator which is connected at one input terminal thereof with said integrator and at the other with said converter for comparing the output of said peak value detector with the output of said theoretical value supplier to generate an output once the former output exceeds the latter output, a flip-flop connected with said first and second comparators for determining the risetime and falltime corresponding, respectively, to the start and end points of the expiration, a pulse signal generator, a gate circuit connected with said flip-flop and pulse signal generator and controlled with said risetime and falltime to pass the pulse signals from said pulse signal generator within the duration from the risetime to the falltime, and a counter for counting said pulse signals when said gate circuit is closed.

8. An apparatus according to claim 5, in which said fifth means further includes a time percent expiratory volume detector connected with said second means and said fourth means, which detector computes the ratio of the output of said fourth means to the output of said second means.

9. An apparatus according to claim 8, wherein said timed, percent expiratory volume detector comprises an integrator connected with the output terminal of said second means for integrating the output thereof, a signal converter connected with the output terminal of said sample holder for inverting the polarity of the output thereof, a first comparator which is connected at one input terminal thereof with the output of said integrator and which is grounded at the other input terminal for comparing the output of said peak value detector with the output of said peak value detector to produce an output once the latter output exceeds the ground level, a second comparator which is connected at one input terminal thereof with said integrator and at the other with said converter for comparing the output of said sample holder with the output of said second means to generate an output once the former output exceeds the latter output, a flip-flop connected with said first and second comparators for determining the risetime and falltime corresponding, respectively, to the start and end points of the expiration, a pulse signal generator, a gate circuit connected with said flip-flop and pulse signal generator and controlled with said risetime and falltime to pass the pulse signals from said pulse signal generator within the duration from the risetime to the falltime, and a counter for counting said pulse signals when said gate circuit is closed.

10. An apparatus according to claim 1, wherein said second means comprises an operational amplifier supplied with the electric signal by said spirometer, a diode and a capacitor serially connected with the output of said amplifier, and means for negatively feeding back the voltage across the capacitor to the input of said amplifier.

11. An apparatus for automatically testing the pulmonary function of a subject in combination with a spirometer which is adapted to produce an electric signal corresponding to the amount of air exhaled thereinto by the subject, which apparatus comprises:

a differentiator for differentiating the electric signal from said spirometer;

a first comparator connected with said differentiator and receiving the output signal thereof;

said first comparator generating an output signal once the signal obtained from said differentiator becomes higher than predetermined positive voltage level for indicating the start point of the expiration;

a second comparator connected with said differentiator and receiving the output signal thereof;

said second comparator generating an output signal once the signal obtained from said differentiator becomes lower than a predetermined negative voltage level for indicating the end point of the expiration;

a flip-flop connected with said first and second comparators for generating a square wave having its risetime and falltime corresponding, respectively, to said start and end points of the expiration;

a counter connected with said first comparator and said flip-flop receiving the output signal thereof;

a timer connected with said counter;

said counter counting the output pulse signals supplied at a predetermined time interval from said timer within the duration of said square wave obtained from said flip-flop for generating sampling pulses;

at least one sample holder connected with said spirometer and said counter;

said sample holder sampling and holding the signal supplied from said spirometer by means of said sampling pulses for indicating the expiratory volume of the subject which is detected at said predetermined interval;

a peak value detector connected with said spirometer, first comparator and flip-flop for detecting the signal supplied from said spirometer at the end point of the expiration for indicating the maximum volume of the expiratory volume of the subject;

a percent vital capacity detector connected with said peak value detector;

a theoretical value supplier connected with said percent vital capacity detector;

said theoretical value supplier supplying said percent vital capacity detector with a signal of a predetermined reference value with which is compared the output signal of said peak value detector for computing the ratio of said output signal to said predetermined reference value; and a timed percent expiratory volume detector connected with said sample holder and peak value detector;

said timed percent expiratory volume detector computing the ratio of the output of said sample holder to the output of said peak value detector.

12. An apparatus for automatically diagnosing a pulmonary function failure of a subject comprising:

first means adapted to be supplied with subject's expiratory volume of air exhaled by the subject for detecting the starting and ending points of the expiration of the subject;

second means for detecting the maximum value of the expiratory volume of air between the starting and ending points thereof so as to obtain vital capacity of the subject;

third means for detecting a predetermined elapsed period of time from said starting point;

fourth means for sampling and holding the quantity of the expiratory volume at such a moment when said third means detects the predetermined elapsed period of time from said starting point so as to obtain the timed quantity of the expiratory volume; and fifth means for providing the ratios of the maximum value of the expiratory volume of air to, respectively, the theoretical vital capacity of the subject and the timed quantity of the expiratory volume, thereby the pulmonary function failure is judged by means of the degrees of the ratios.

13. An apparatus as according to claim 12, wherein said first means comprises a spirometer which operatingly converts into electric signals the subject's expiratory volume of air, a differentiator for differentiating the electric signal, and means for detecting the time when the output of the differentiator exceeds zero from minus to plus and vice versa, respectively whereby the starting and ending points are provided.

14. An apparatus according to claim 13, wherein said means for detecting the time when the output of the differentiator exceeds zero from minus to plus and vice versa comprises a first comparator which receives a reference input corresponding to a predetermined expiratory rate of approximately 200 ml./sec. to compare with the output of the differentiator whereby said comparator produces the output corresponding to the starting point of the expiration and a second comparator which receives a minus input to compare with the output of the differentiator whereby the output of said comparator indicates the ending point of the expiration.

15. An apparatus according to claim 12, wherein said second means for detecting the maximum value of the expiratory volume of air comprises an operational amplifier supplied with said electric signal by said spirometer, a diode and a capacitor serially connected with the output of said amplifier, and means for negatively feeding back the voltage across the capacitor to the input of said amplifier thereby obtaining the voltage across the capacitor as the maximum expiratory volume.

16. An apparatus according to claim 12, which further comprises means for providing the theoretical vital capacity of the subject comprising a subtractor, at least two pairs of constant coefficient-setting resistors for both male and female subjects, two resistors, a potentiometer for setting a predetermined coefficient multiplied by the age of the subjects, and a potentiometer for multiplying the output of the subtractor by a stature.

17. An apparatus according to claim 12, wherein said fifth means for providing the ratio between the theoretical and actual vital capacities of the subjects comprises an integrator adapted to receive theoretical vital capacity signal as its input, a sign inverter adapted to receive the actual capacity, a first comparator which receives the output of the integrator and the other grounded, a second comparator which receives the output of the integrator and that of the inverter, a flip-flop, a pulse signal generator, a gate circuit which is controlled by the output of the flip-flop and counter means.

18. An apparatus according to claim 12, wherein said fifth means for providing the ratio between the actual vital capacity and timed volume of the expired air comprises an integrator, a sign inverter, a first comparator which receives the output of the integrator and the other grounded, a second comparator which receives the output of the integrator and of the inverter, a flip-flop, a pulse signal generator, a gate circuit which is controlled by the output of the flip-flop and a counter whereby the integrator receives the actual vital capacity as its input and the inverter receives the timed expired air.

*19. An apparatus for testing the pulmonary function of a subject in combination with a spirometer which is adapted to produce an electric signal having an amplitude*

*corresponding to the subject's expiratory volume of air exhaled thereinto by the subject, which apparatus comprises:*

*first means adapted to receive the electric signal from said spirometer for operatingly producing start and end signals representative respectively of commencement and termination of the subject's expiration of air when the amplitude of the electric signal exceeds a first predetermined level and falls below a second predetermined level, respectively; and*

*second means adapted to receive the electric signal from said spirometer and rendered operative from the start signal to the end signal for operatively detecting a peak value of the electric signal during the operative period thereof;*

*whereby the peak value of the electric signal thus obtained is recognized as a correspondence to a value of vital capacity of the subject.*

*20. The apparatus according to claim 19, which further comprises means adapted to receive the peak value of the electric signal from said second means and a predetermined theoretical value signal representative of a theoretical vital capacity of the subject for operatingly producing a ratio of the peak value to the theoretical value signal, so that the ratio thus obtained is usable for detection of presence of a failure in the subject's pulmonary function.*

*21. The apparatus according to claim 19, which further comprises:*

*means adapted to receive the start and end signals from said first means for operatingly producing at least one sampling signal at a time when a preselected period has elapsed from the start signal;*

*means responsive to said sampling signal and adapted to receive the electric signal from said first means for operatively sampling the electric signal upon said sampling signal, so as to obtain a signal representative of a timed expiratory volume of the subject; and*

*means adapted to receive the peak value of the electric signal from said second means and the signal representative of the time expiratory volume for operatingly producing a ratio of the peak value to the signal representative of the timed expiratory volume; whereby the ratio thus obtained is recognized as a ratio of the vital capacity to the time expiratory volume of the subject and is usable for detecting the extent and type of a failure in the subject's pulmonary function.*

*22. The apparatus according to claim 19, wherein said first means comprises:*

*a differentiator adapted to receive the electric signal from said spirometer for operatingly generating a differentiated signal of the electric signal; and*

*means adapted to receive the differentiated signal of the electric signal for operatingly producing start and end signals when the amplitude of the differentiated signal of the electric signal exceeds a first predetermined level and falls below a second predetermined level, respectively.*

*23. The apparatus according to claim 19, wherein said second means comprises:*

*an operational amplifier supplied with the electric signal from said spirometer;*

*a diode and a capacitor serially connected with an output of said operational amplifier so as to cause a voltage across said capacitor when said diode is conducting, said voltage being held in said capacitor when said diode is non-conducting; and*

*means for negatively feeding back the voltage across said capacitor to an input of said operational amplifier; so that the peak value of said electric signal is detected as the voltage across said capacitor.*

*24. An apparatus for testing the pulmonary function of a subject in combination with a spirometer which is adapted to produce an electric signal having an amplitude corresponding to the subject's expiratory volume of air exhaled thereinto by the subject, which apparatus comprises:*

*first means adapted to receive the electric signal from said spirometer for operatingly generating, from the electric signal thus received, start and end signals representative of commencement and termination of the subject's expiration of air, respectively; and*

*second means adapted to receive the electric signal from said spirometer and rendered operative in a period between the start and end signals for operatively detecting a peak value of the electric signal during the period between the start and end signals; so that the peak value of the electric signal thus obtained is recognized as a correspondence to a value of vital capacity of the subject.*

*25. The apparatus according to claim 24, wherein said first means comprises:*

*a differentiator adapted to receive the electric signal from said spirometer for operatingly producing a differentiated signal of the electric signal;*

*a start signal generator adapted to receive the differentiated signal of the electric signal from said differentiator for operatingly generating a start signal when the amplitude of the differentiated signal of the electric signal exceeds a predetermined level; and*

*an end signal generator adapted to receive the start signal from said start signal generator for operatingly generating an end signal after a predetermined time duration from the start signal.*

*26. The apparatus according to claim 24, which further comprises means adapted to receive the peak value of the electric signal from said second means and a predetermined theoretical value signal representative of a theoretical vital capacity of the subject for operatingly producing a ratio of the peak value to the theoretical value signal, so that the ratio thus obtained is usable for detection of presence of a failure in the subject's pulmonary function.*

*27. The apparatus according to claim 24, which further comprises:*

*means adapted to receive the start and end signals from said first means for operatingly producing at least one sampling signal at a time when a preselected period has elapsed from the start signal;*

*means responsive to said sampling signal and adapted to receive the electric signal from said first means for operatively sampling the electric signal upon said sampling signal, so as to obtain a signal representative of a timed expiratory volume of the subject; and*

*means adapted to receive the peak value of the electric signal from said second means and the signal representative of the timed expiratory volume for operatingly producing a ratio of the peak value to the signal representative of the timed expiratory volume; whereby the ratio thus obtained is recognized as a ratio of the vital capacity to the timed expiratory volume of the subject and is usable for detecting the extent and type of a failure in the subject's pulmonary function.*

* * * * *